United States Patent
Dunn et al.

(10) Patent No.: US 6,415,024 B1
(45) Date of Patent: Jul. 2, 2002

(54) SYSTEM AND METHOD FOR SPECIAL CALL DETECTION AND BILLING TREATMENT

(75) Inventors: James Patrick Dunn, Northville Township; Don Howard Dvorak, Hinsdale; Mark Alan Lassig, Naperville, all of IL (US); Eugene J. Rosenthal, Edison; Ronald David Slusky, Highland Park, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/059,904

(22) Filed: Apr. 13, 1998

Related U.S. Application Data

(63) Continuation-in-part of application No. 08/693,767, filed on Aug. 7, 1996, now abandoned.

(51) Int. Cl.[7] .................. H04M 15/00; H04M 1/24; H04M 11/00
(52) U.S. Cl. .............. 379/114.05; 379/100.04; 379/112.01; 379/1.01; 379/32.02; 379/121.01
(58) Field of Search ............... 379/111, 114, 379/115, 120, 121, 93.14, 100.01, 100.04, 113, 133, 134, 136, 137, 138, 139, 100.03, 100.05, 1, 9, 10, 15, 34; 370/352, 356

(56) References Cited

U.S. PATENT DOCUMENTS

| | | | | |
|---|---|---|---|---|
| 5,490,199 A | * | 2/1996 | Fuller et al. ................ | 379/1 |
| 5,781,617 A | * | 7/1998 | McHale et al. ............ | 379/93.14 |
| 5,832,240 A | * | 11/1998 | Larsen et al. .............. | 395/285 |
| 5,864,763 A | * | 1/1999 | Leung et al. ............... | 455/557 |
| 5,898,763 A | * | 4/1999 | Azuma et al. ............. | 379/114 |
| 5,905,785 A | * | 5/1999 | Dunn et al. ................ | 379/113 |
| 5,946,386 A | * | 8/1999 | Rogers et al. ............. | 379/265 |
| 5,956,391 A | * | 9/1999 | Melen et al. .............. | 379/114 |
| 6,035,020 A | * | 3/2000 | Weinstein et al. ......... | 379/93.09 |
| 6,075,847 A | * | 6/2000 | Leung ..................... | 379/100.17 |
| 6,263,016 B1 | * | 7/2001 | Bellenger et al. .......... | 375/222 |

OTHER PUBLICATIONS

L. Freimanis et al.: Wo.1 ESS Scanner, Signal Distributor, and Central Pulse Distributor; Bell Sys. Tech. Journal, V. 43, No. 5, Part II, Sep. 1964, pp2255–2271.

* cited by examiner

Primary Examiner—Binh Tieu
(74) Attorney, Agent, or Firm—Werner Ulrich

(57) ABSTRACT

It is desirable to be able to recognize data calls so that different charges can be applied to such calls and that vertical services, such as the use of special transmission facilities, may be offered to data callers. This recognition is accomplished by attaching a tone detector to a call in order to detect the special tones characteristic of a data call. Advantageously, this permits different charges to be imposed on data calls.

28 Claims, 3 Drawing Sheets

SYSTEM AND METHOD FOR SPECIAL CALL DETECTION AND BILLING TREATMENT

RELATED APPLICATIONS

This application is a continuation-in-part of U.S. Pat. No. 08/693,767 filed on Aug. 7, 1996 by J. P. Dunn, D. H. Dvorak, and M. A. Lassig entitled "Special Call Detection", and is related to U.S. patent application Ser. No. 08/693,768 filed Aug. 7, 1996 by J. P. Dunn, D. H. Dvorak, and M. A. Lassig, entitled "Detecting High Usage Telecommunications Lines", filed Aug. 7, 1996, and both applications assigned to the same assignee as this application.

TECHNICAL FIELD

This invention relates to the field of telecommunications, and more specifically, to detection of specialized calls, such as data calls in telecommunication systems, and to differential billing for data and voice calls.

BACKGROUND

For many year it has been the policy in the United States and Canada to provide telecommunications service and to make billing for such services independent of the content of the communication. While this policy has served admirably to support the building of universal voice telephone service and to expand greatly the use of the telecommunications network for data services, there are signs that this type of policy may no longer be as strongly favored by the regulatory authorities. One sign of such discrimination has been a recent decision in Canada to have a different inter-carrier compensation for a data call than for a voice call, provided the originating carrier can demonstrate that a call is a data call. Regulatory and social factors which may influence separate treatment of such calls are the different economic and/or social values of data calls as contrasted with voice calls. There still is a very strong pressure to minimize charges for minimum local service and to insure that even high usage local service remains within the economic means of the elderly or the poor. For example, it is possible that a different time sensitive tariff may be imposed on short haul data calls.

A partial solution to this problem has been implemented in some cases by examining the destination number of telephone calls as part of the bill calculation process; this process then distinguishes calls known on the basis of the called number to be data calls from other calls and therefore gives such calls appropriate billing treatment. This solution is quite unsatisfactory because so many, even of the frequently used data destinations, are not announced by their customers as being data destinations, and therefore escape whatever negative effect an identification of a call through these destinations would have on the callers.

Another partial solution is provided by monitoring out of band signalling calls. However, this only detects a fraction of the data calls currently being made.

Another serious problem, however, is that on-line or Internet service providers are offering monthly flat fee packages. As a result, data users are staying on a telephone line for hours or even days at a time. On the other hand, the current telephone network is designed for voice calls, which average two minutes. Thus, the voice telephone network is highly concentrated so that expensive capital equipment is not purchased and then used minimally. These assumptions are no longer fully valid. With more and more people using telephone lines for data services, and these people are staying on-line for longer periods of time, the network occasionally (and more and more frequently) becomes congested, and some customers do not receive service, or even dial tone. This may be disastrous in the event of an emergency.

SUMMARY OF THE INVENTION

We have recognized that a problem of the prior art is that a satisfactory and economical arrangement for distinguishing between in-band signalled data calls and voice calls on a per call basis, and for charging differently for data calls does not exist.

The above problem is solved and an advance is made over the prior art in accordance with this invention wherein data calls are identified by connecting a signal detector during or subsequent to the establishment of a connection and the recognition of an answer signal by the called station. Advantageously, the holding time of such a signal detector which is connected on every call is small so that the cost is kept low. After a determination of a data or a voice call is made, then the call can be billed so that a traditional voice call is treated according to the prior art, but the data call is billed differently, either according to time, or with a higher charge, or both. With such charges possible, it is also possible to offer flat rate data service with a much higher flat rate charge.

In accordance with one aspect of Applicants' invention, a signal detector is implemented using a signal processor capable of examining the digit stream representing the signal generated by callers and called customers for many calls simultaneously. Advantageously, this type of arrangement sharply reduces the cost of the tone detection process.

Advantageously, these arrangements allow for a billing mark to be entered on every call record for a data call, thus simplifying the processing of these billing records to produce customer statements. In accordance with another feature of this invention, a data set is adapted to provide an initial tone. Advantageously, this arrangement permits a data call to be recognized immediately and allows vertical services, such as the use of specially conditioned transmission facilities, to be readily implemented.

In Applicants' preferred embodiment, an enhanced digit detector detects the tone signals characteristic of a data call. If such signals are not detected, the call is determined to be a voice call, and normal local billing procedures may be used. If a data call is detected, then usage based charges such as those often used for long distance calls or, alternatively, some minimum special charge, may be used; alternatively, the regular voice billing charge can be used for a data call shorter than a pre-specified limit. Advantageously, voice calls may be rechecked for data at random or predetermined intervals to prevent fraud and thus, enhance revenue and discourage unnecessary usage of the telephone network.

These arrangements can also be used to further discriminate among data type calls, e.g., to distinguish from Internet usage from facsimile calls, provided that each type call has a characteristic signal or set of signals. Each distinguishable type of call may be billed with its own billing rate scheme. For example, Internet type calls may be billed on a per-minute basis, while a first portion, e.g., the first ten minutes, of a long facsimile call may be free or may cost a single unit if the caller has unlimited duration voice calling in a particular area, and may be billed thereafter at a per-minute facsimile rate.

BRIEF DESCRIPTION OF THE DRAWING

A more complete understanding of the invention may be obtained from a consideration of the following description in conjunction with the drawings, in which.

DETAILED DESCRIPTION

Figure 1:
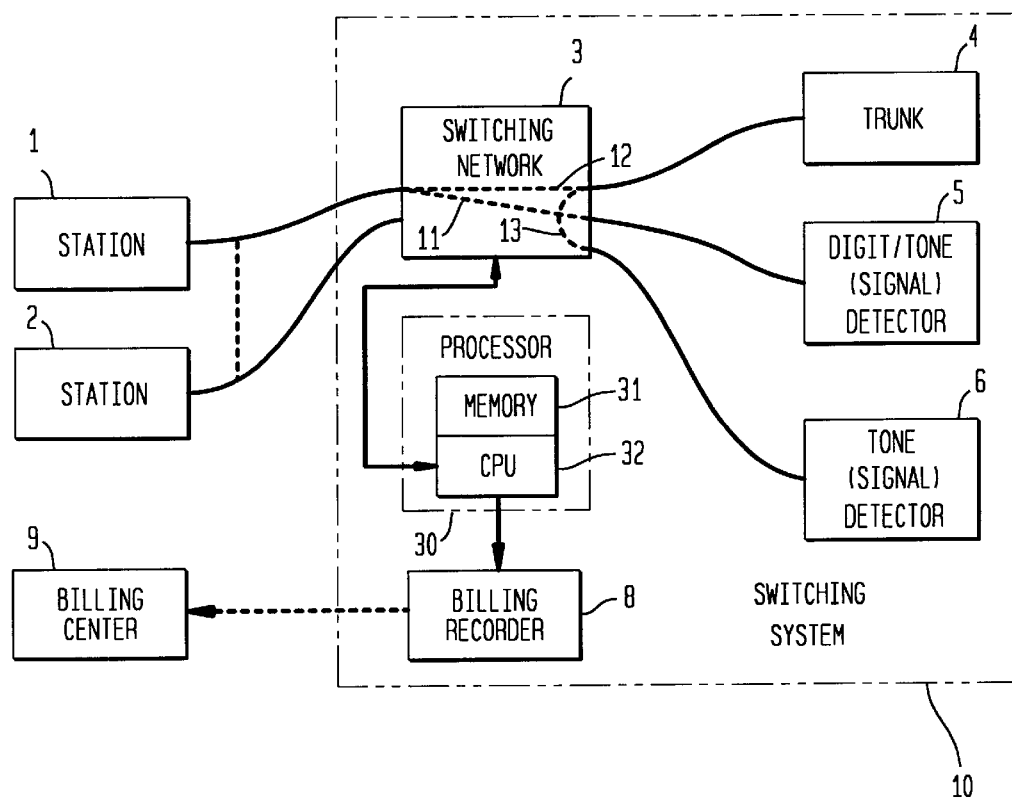
FIG. 1 is a block diagram illustrating Applicants' invention.

FIG. 1 is a block diagram illustrating the basic operation of Applicants' invention. A switching network 3, including any special adjuncts for connecting service circuits, such as digital detectors, to the lines or trunks, is used to interconnect stations 1, . . . ,2 with outgoing trunks, digit/signal detectors 5, or signal detectors 6. While the digit/signal detectors are shown separately, in practice, the best arrangement is likely to be one wherein any of the digit/signal detectors 5 and signal detectors 6 can be used for both functions, i.e., the function of detecting dialed or keyed digits from customers and the function of detecting the signals which characterize a data connection. In Applicants' preferred embodiment, the signals are tones and only a single type of detector is used. This detector is the conventional digit/tone detector 5 used for detecting dialed or keyed digits augmented to recognize the additional tones of a data connection.

Figure 2:
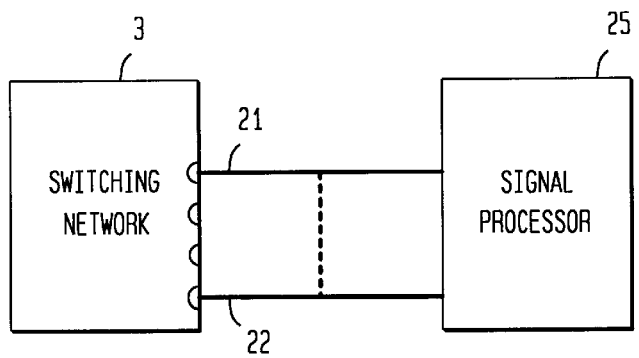
FIG. 2 is a block diagram illustrating a preferred embodiment of a data call signal detector.

FIG. 2 is a preferred implementation for such detectors. It consists of a signal processor 25 which is connected to a plurality of ports 21, . . . ,22 of the switching network 3. Signal processor 25 has sufficient capacity to process the signals received from the switching network for a substantial number of channels terminated at ports 21, . . . ,22.

Most current data calls using in-band signalling are identified by special unmodulated tones. However, other types of signals can be used to identify such calls, For example, a tone modulated by frequency or phase shift keying or a tone modulated by amplitude or frequency modulation can be used to identify a data call. The signal processor 25 can be readily programmed to detect such signals. In addition, if a data set is arranged to emit an initial tone, this can be recognized immediately in detector 5, and vertical services, such as the use of specially conditioned transmission facilities, or the option to use a specialized data carrier, can be offered to the caller.

Switching network 3, (FIG. 1), in the preferred embodiment, is a digital network which transmits digital signals between lines connected to stations 1, . . . ,2 and trunks 4, or detectors 5, 6. Such a network can readily transmit the digital signals which represent an analog signal from one source to a number of destinations. This makes it easy to connect a detector as well as a line, to an outgoing trunk 4. Thus, for an outgoing call, switching network 3 originally establishes path 11 between station 1 and digit/tone detector 5. After the customer has dialed the requested number, the connection 12 is established between station 1 and outgoing trunk 4; when answer is received, tone detector 6 or digit/tone detector 5 is bridged on to this connection by connection 13 so that the tone detector can detect whether any of the tones characteristic of a data connection are present. While the connection 13 is shown in FIG. 1 as being to the trunk 4, it can be to any point in the connection between trunk 4 and the line connected to station 1. Alternatively, a speech detector can be used and a call can be determined to be a data or fax call if no speech is detected.

The switching network operates under the control of processor 30. Processor 30 includes memory 31 for storing a control program and billing data, and a central processing unit (CPU) 32 for controlling network 3 and for receiving information from detectors 5 and 6. The programs shown in flow diagram 3 is executed in processor 30. The diagram illustrates only an outgoing call. For an incoming call and for an intra-office call, the tone detector 6 or digit/tone detector 5 can also be bridged across a connection; the tone detector is bridged to a connection from an incoming trunk in the same way as it is bridged to a connection to an outgoing trunk and it is bridged across a connection between two lines in a bridging connection, (not shown) since two lines can also be interconnected by switching network 3. Processor 30, switching network 3, trunk 4, and detectors 5 and 6 are all part of switching system 10.

Processor 30 is also connected to a billing recorder 8 for recording billing data. This data is subsequently processed in a billing center 9 for generating customer bills. The billing record of a call determines the charge that the billing center will generate for that call. Effectively, by recording one type of indication, e.g., "data call" or a default indication, e.g., "voice call", the processor can cause one or the other type of charge to be billed for that call. The act of entering a billing indication is therefore the means for billing different types of calls, e.g., flat rate or time metered calls.

In the future, it may be important to be able to monitor incoming as well as outgoing calls and intra-office calls. This would allow terminating vertical services, such as an announcement of a data call, to be implemented. Further, if charges were to be shared between originating and terminating parties for some or all data calls, it would be necessary to monitor terminating calls to detect data calls.

Figure 3:
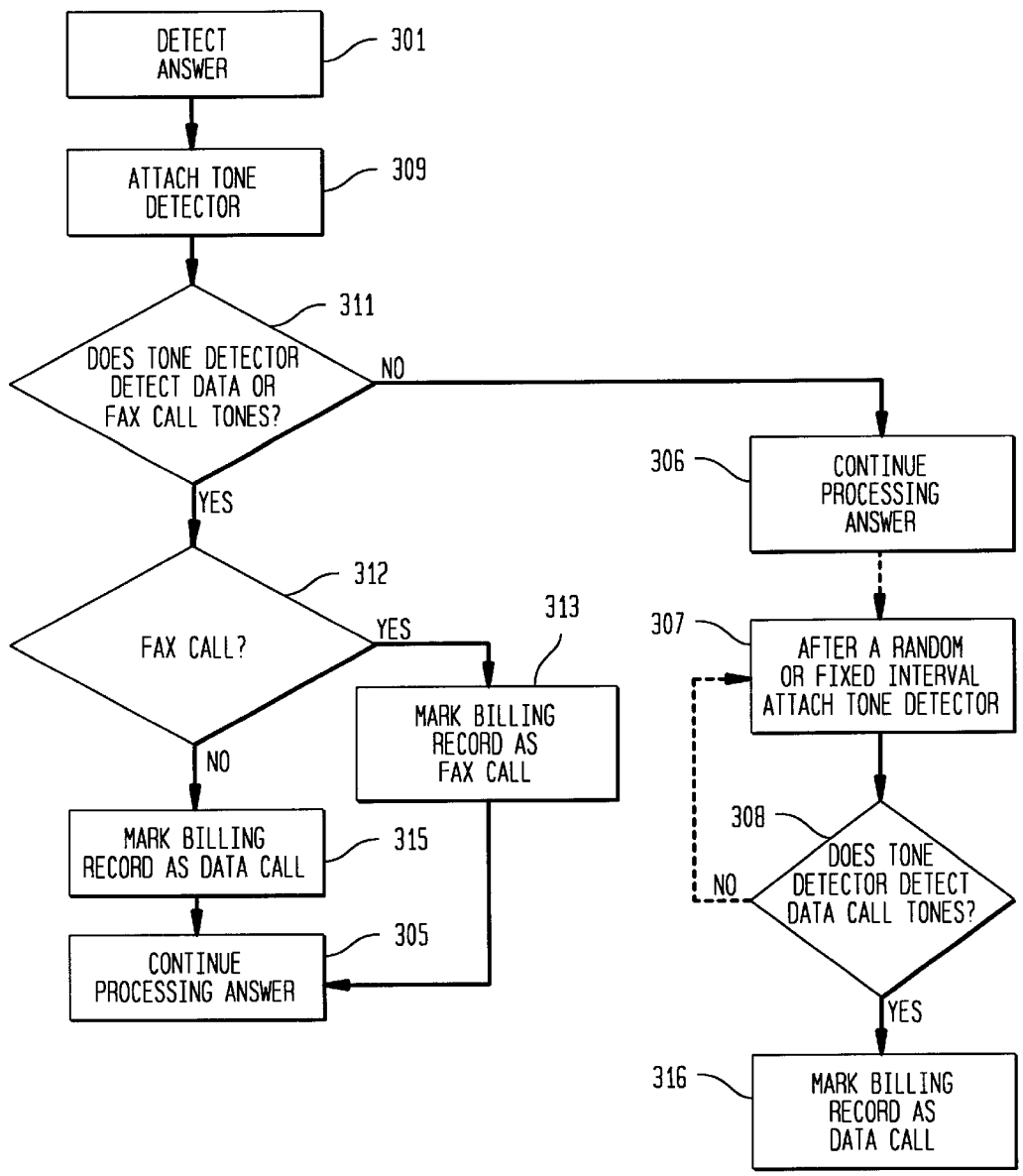
FIGS. 3 and 4 are flow diagrams illustrating the method of Applicants' invention.

FIG. 3 illustrates the process of handling a call in accordance with the principles of the invention. After a call has been set up, answer for the call is detected (Action Block 301). Note that while the initial applications of the invention may continue the present practice wherein (except for 800 calls, collect calls, bill to third party calls), the calling customer is charged for the call, it would be very straightforward to have the terminating switch also detect an answer signal, monitor the call, and make a special billing entry if the call was found to be a data call through the use of a tone detector. U.S. Pat. No. 5,381,467 issued to Rosinski et al, incorporated herein by reference, discloses arrangements for permitting a called party to signal a request to share call charges by keying dual tone multifrequency (DTMF) tones on a received call.

When answer is detected, a tone detector is attached to the connection (Action Block 309), as noted above. The attachment of a tone detector which is only in the listening mode is very straightforward in a digital network; the signals are sent from a source to the normal destination and also the alternate destination tone detector. Test 311 is used to determine whether the tone detector has detected a data or fax call by having detected the data or fax call tones.

Alternatively, or additionally, the switching system may, if the result of Test 311 is that a fax or data tone has been detected, use Test 312 to determine whether the call has the protocol of a fax call. If so, Test 312 determines that this is a fax call, then the billing record is marked to indicate that the call is a fax call (Action Block 313). If the result of Test 312 indicates that this is not a fax call, then the billing record is marked to indicate that this is a data call (Action Block 315). Following both Action Blocks 313 and 315, answer processing continues (Action Block 305). If the tone detector does not detect data calls, then answer processing is continued (Action Block 306).

Following the use of Action Block 306, (in contrast to Action Block 305), at random or fixed intervals thereafter, a tone detector is attached to the call to determine whether the call is now a data call (Action Block 307). This is to prevent the differential charging of data calls from being by-passed by having an initial short period without data tones. By using a random testing interval, it is possible to catch data calls made by sophisticated users who arrange to have data signal interrupted at the critical times when a periodic test for data calls might be made. The length of time of the random or periodic interval for testing, depends to some extent on the objective of the test. If the objective is primarily to insure that all data calls are appropriately charged, then the testing interval can be short. If the primary objective is to insure that very long data calls are charged appropriately, then the use of Action Block 307 can be invoked at less frequent intervals.

Following the attachment of the tone detector in Action Block 307, Test 308 is used to determine whether the tone detector has detected data tone calls. If so, then the billing record for this call is marked as a data call (Action Block 316). If the result of Test 308 is negative, i.e., no data call tones detected, then after a suitable interval, Action Block 307 is re-entered to try again.

The result of the above steps is that data calls and fax calls are detected and the billing record for these calls is appropriately marked for subsequent processing in a billing center. Further, following Action Blocks 315 or 316 (FIG. 3), vertical services, such as the use of special transmissions facilities can be offered. Note that if a data station emits a characteristic signal before it is connected to the called party, then the originating caller can be immediately offered vertical services, such as the use of specially conditioned transmission facilities, if the call is initially recognized to be a data call.

Figure 4:
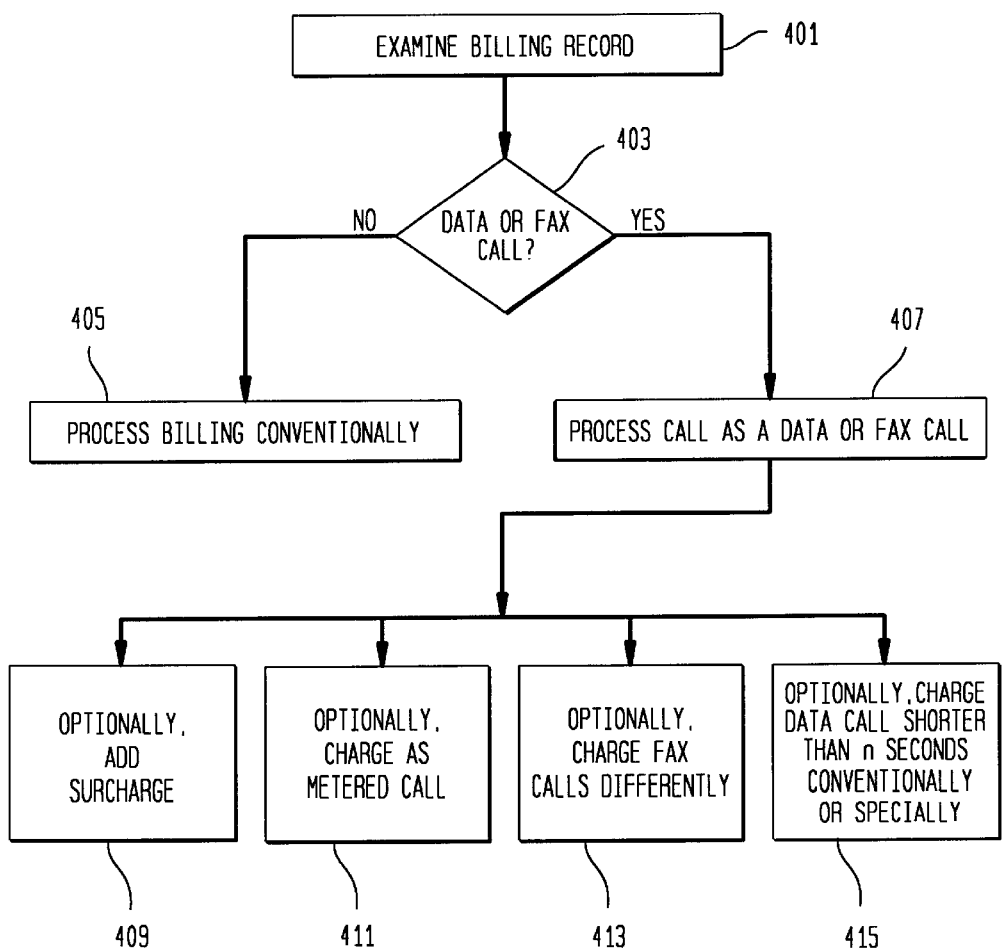

FIG. 4 illustrates the actions performed in the billing center. In the billing center, the billing record of a call is examined (Action Block 401). Test 403 determines whether or not this is a data or fax call. If not, then the billing record is processed conventionally, i.e., as in the prior art, (Action Block 405). If this is a data or a fax call, then the call is processed as a data or fax call, (Action Block 407).

Action Blocks 409, 411, 413, and 415 indicate some of the options that a particular telephone administration can implement as part of the processing of data or fax calls. Action Block 409 indicates that a surcharge can be added to the call. The surcharge can be different for data and fax calls. Action Block 411 indicates that the call may be optionally charged as a metered call, i.e., charged according to the length of time of the call. Action Block 413 indicates that the charges for fax calls may be different from those for data calls. For example, the charge for fax calls may be the same as the charge for voice calls. For another example, the charge for fax calls may be the same as voice calls if the duration of the fax call is less than some predetermined period of time. Another option is to charge data calls shorter than n seconds, either conventionally (i.e., the same as for a voice call), or to have a separate charge which can be either less or more than the charge for a short voice call (Action Block 415).

The example of Action Blocks 409, 411, 413, and 415 are only some of the options available to telephone administrations for having different charges for data calls and fax calls, in contrast to voice calls. The same principles can also be applied to any other call which can be detected through the use of signal detectors, and for which in response to this detection, an indication of the special call is made in the billing record of that call.

It is to be understood that the above described embodiments are merely illustrative principles of the invention and that many variations may be devised by those skilled in the art without departing from the scope of the invention. It is, therefore, intended that such variations be included within the scope of the Claims.

What is claimed is:

1. A method of detecting a data call for data transmitted using a signal different from a FAX signal in a telecommunications switching system, comprising the steps of:
   establishing an apparent voice call connection;
   detecting an answer signal on a call;
   failing to detect that a called number of said data call is that of a data destination;
   in a switching network of said telecommunications switching system connecting a tone detector to said call after said answer signal has been detected; and
   detecting whether said tone detector has detected the tones characteristic of a data call for data transmitted using a signal different from a FAX signal.

2. The method of claim 1, wherein the step of connecting a tone detector comprises the step of connecting a data stream representing a signal from a telecommunications station to a detector as well as to a destination for said call through a circuit switching network comprising at least one time switching stage.

3. The method of claim 1, wherein the step of connecting a tone detector comprises the step of connecting one port of a tone detector controlled by a signal processor.

4. The method of claim 1, further comprising the step of: responsive to detecting that a call is a data call, for data transmitted using a signal different from a FAX signal, making an entry signifying a data call for data transmitted using a signal different from a FAX signal in a billing entry for said call.

5. A method of detecting a data call for data transmitted using a signal different from a FAX signal, in a telecommunication switching system comprising the steps of:
   responsive to detecting an origination from a line, establishing an apparent voice call connection;
   connecting a tone signal detector via a circuit switching network to said connection; and
   testing for a signal indicating a data call for data transmitted using a signal different from a FAX signal, using said tone signal detector.

6. The method of claim 5, wherein the testing step comprises the step of testing for said signal indicating a data call for data transmitted using a signal different from a FAX signal, using a combined digit detector/signal detector.

7. In a telecommunication switching system, apparatus for detecting a data call comprising:
   a switching network;
   signal detectors, for detecting tone signals of a data call for data transmitted using a signal different from a FAX signal, connected to said switching network;
   processor means operative under the control of a program, for controlling said switching network and receiving outputs of said signal detectors;
   said processor means, responsive to reception of an originating call, for establishing an apparent voice call connection;
   said processor means for connecting one of said signal detectors to said call connection to detect whether said call is a data call for data transmitted using a signal different from a FAX signal;
   wherein said apparatus and connected databases fail to detect that a called number of said data call is that of a data destination.

8. The apparatus of claim 7, wherein said processor means connects said one of said signal detectors after receipt of an answer signal of said call.

9. The apparatus of claim 7, wherein said processor means connects said one of said signal detectors upon origination of said call.

10. The apparatus of claim 7 wherein said processor means makes a billing entry if said call is a data call for data transmitted using a signal different from a FAX signal.

11. In a telecommunications switching system, a method of detecting a call for data transmitted using a signal different from a FAX signal, having a characteristic signal or set of signals, comprising the steps of:

establishing an apparent voice call connection;

responsive to detecting a receipt of an answer indication on said voice call connection, connecting a tone signal detector to said line through a circuit switching network of said telecommunications switching system; and failing to detect that a called number of said data call is that of a data destination;

testing for a signal indication of a call for data transmitted using a signal different from a FAX signal, using said tone signal detector.

12. The method of claim 11 wherein the connecting step comprises the step of connecting a digit detector adapted to also detect said characteristic signal or set of signals.

13. A method for differential billing of telephone calls in a telephone switching system, said switching system having means for making a billing entry for a call, said method comprising the steps of:

receiving a call origination request in said telephone switching system;

establishing an apparent voice call connection for a call requested by said call origination request through a circuit switching network of said telephone switching system;

failing to detect that a called number of said data call is that of a data destination;

determining via a connected detector whether said call connection is for a voice call or a data call for data transmitted using a signal different from a FAX signal;

upon determining that said call is a voice call, making a flat rate billing entry for said voice call; and upon determining that said call is a data call for data transmitted using a signal different from a FAX signal, making a time metered billing entry for said data call.

14. The method of claim 13, further comprising the step of determining whether the call is a local call prior to executing the step of determining whether said call origination request is for a voice call or a data call, for data transmitted using a signal different from a FAX signal.

15. A method in accordance with claim 13, wherein the step of determining whether said call origination request is for a voice call or a data call for data transmitted using a signal different from a FAX signal, comprises applying a data signal detection device to the call upon call completion.

16. A method in accordance with claim 13, wherein the step of determining whether said call origination request is for a voice call or a data call for data transmitted using a signal different from a FAX signal, comprises said switching system receiving a data call for data transmitted using a signal different from a FAX signal indicator signal during said call origination request.

17. A method for differential billing of telephone calls in a telephone switching system, said switching system having means for making a billing entry for a call, said method comprising the steps of:

receiving a call origination request in said telephone switching system;

determining whether said call origination request is for a voice call or a data call for data transmitted using a signal different from a FAX signal;

upon determining that said call origination request is for a voice call, making a flat rate billing entry for said voice call; and upon determining that said call origination request is for a data call, making a time metered billing entry for said data call;

said method further including, after determining that said call origination request is for a voice call, at least once determining whether said voice call has converted to a data call, and, in response to determining that said call has converted to a data call, making a time metered billing entry for said call.

18. A method for differential billing of telephone calls in a telephone switching system, said switching system having means for making a billing entry for a call, said method comprising the steps of:

receiving a call origination request in said telephone switching system;

determining whether said call origination request is for a voice call or a data call;

upon determining that said call origination request is for a voice call, making a flat rate billing entry for said voice call; and upon determining that said call origination request is for a data call, making a time metered billing entry for said data call;

said method further including after determining that said call origination request is a voice call, at random intervals of time determining whether said voice call has converted to a data call, and, in response to determining that said call has converted to a data call, making a time metered billing entry for said call.

means responsive to said determining means determining that said call origination is for a data for causing said means for making a billing entry to make a billing entry for a time metered call said call;

said system apparatus further including means for determining periodically whether a voice call has been converted to a data call; and if a voice call has been converted to a data call, changing said billing entry to a billing entry for a time metered call.

19. A method for differential billing of telephone calls in a telephone switch-ing system, said switching system having means for making a billing entry for a call said method comprising the steps of:

receiving a call origination request in said telephone switching system;

determining whether said call origination request is for a voice call or a data call;

upon determining that said call origination request is for a voice call, making a flat rate billing entry for said voice call; and upon determining that said call origination request is for a data call, making a time metered billing entry for said data call;

said method including after determining that said call origination request is a voice call, periodically determining whether said voice call has converted to a data call, and, in response to determining that said call has converted to a data call, making a time metered billing entry for said call.

20. A telephone switching system apparatus, said switching system including means for receiving a call origination request and means for completing said call, said switching system also including means for making a billing entry for flat rate calls and for making a billing entry for time metered calls, said switching system including the improvement of:
   means for establishing an apparent voice call connection using a circuit switching network;
   detector means for determining whether a call is a voice call or a data call for data transmitted using a signal different from a FAX signal;
   means responsive to said determining means determining that said call is a voice call for causing said means for making a billing entry to make a billing entry for a flat rate call for said call; and
   means responsive to said determining means determining that said call is a data call for data transmitted using a signal different from a FAX signal, for causing said means for making a billing entry to make a billing entry for a time metered call for said call;
   wherein said apparatus and connected databases fail to detect that a called number of said data call is that of a data destination.

21. An apparatus in accordance with claim 20, wherein said determining means comprises a modem detector.

22. An apparatus in accordance with claim 20, where said determining means comprises a tone detector.

23. An apparatus in accordance with claim 20, wherein said determining means comprises a voice detector.

24. A telephone switching system apparatus, said switching system including means for receiving a call origination request and means for completing said call, said switching system also including means for making a billing entry for flat rate calls and for making a billing entry for time metered calls, said switching system including the improvement of:
   means for determining whether a call origination is for a voice call or a data call;
   means responsive to said determining means determining that said call origination is for a voice call for causing said means for making a billing entry to make a billing entry for a flat rate call for said call; and
   means responsive to said determining means determining that said call origination is for a data call for causing said means for making a billing entry to make a billing entry for a time metered call for said call;
   said system apparatus further including means for determining at least once during a call whether a voice call has been converted to a data call; and
   if a voice call has been converted to a data call, changing said billing entry to a billing entry for a time metered call.

25. A telephone switching system apparatus, said switching system including means for receiving a call origination request and means for completing said call, said switching system also including means for making a billing entry for flat rate calls and for making a billing entry for time metered calls, said switching system including the improvement of:
   means for determining whether a call origination is for a voice call or a data call;
   means responsive to said determining means determining that said call origination is for a voice call for causing said means for making a billing entry to make a billing entry for a flat rate call for said call; and
   means responsive to said determining means determining that said call origination is for a data call for causing said means for making a billing entry to make a billing entry for a time metered call for said call;
   said system apparatus further including means for determining at random intervals of time whether a voice call has been converted to a data call; and
   if a voice call has been converted to a data call, changing said billing entry to a billing entry for a time metered call.

26. A telephone switching system apparatus, said switching system including means for receiving a call origination request and means for completing said call, said switching system also including means for making a billing entry for flat rate calls and for making a billing entry for time metered calls, said switching system including the improvement of:
   means for determining whether a call origination is for a voice call or a data call;
   means responsive to said determining means determining that said call origination is for a voice call for causing said means for making a billing entry to make a billing entry for a flat rate call for said call; and
   means responsive to said determining means determining that said call origination is for a data call for causing said means for making a billing entry to make a billing entry for a time metered call for said call;
   said system apparatus further including means for determining periodically whether a voice call has been converted to a data call; and
   if a voice call has been converted to a data call, changing said billing entry to a billing entry for a time metered call.

27. An apparatus in accordance with claim 20, further comprising:
   means, responsive to said determining means determining that said call origination is for a data call for data transmitted using a signal different from a FAX signal, for causing said means for making a billing entry to make a billing entry for a voice call for said call if said call is shorter than a pre-specified length of time.

28. An apparatus in accordance with claim 26, further comprising:
   means, responsive to said determining means determining that said call origination is for a data call for causing said means for making a billing entry to make a billing entry for a voice call for said call if said call is shorter than a pre-specified length of time.

* * * * *